United States Patent [19]

Hart

[11] 4,390,926
[45] Jun. 28, 1983

[54] PORTABLE SWITCHING UNIT

[75] Inventor: Randall A. Hart, North Hollywood, Calif.

[73] Assignee: Lexus Liting, Inc., Los Angeles, Calif.

[21] Appl. No.: 259,460

[22] Filed: May 1, 1981

[51] Int. Cl.³ .............................................. H02B 1/10
[52] U.S. Cl. ........................................ 361/334; 335/6; 361/357; 361/363; 361/426
[58] Field of Search ............... 361/115, 331, 334, 356, 361/357, 390, 392, 426, 429, 363; 335/6; 174/52 R; 307/112-115, 150

[56] References Cited

U.S. PATENT DOCUMENTS

| | | | |
|---|---|---|---|
| 2,988,655 | 6/1961 | Rudolph | 361/334 |
| 3,663,864 | 5/1972 | Carlson | 307/150 |
| 3,721,865 | 3/1973 | Rademaker | 174/52 R |
| 3,873,848 | 3/1975 | O'Brien | 307/114 |
| 3,928,737 | 12/1975 | Prasert | 307/114 |

Primary Examiner—G. P. Tolin
Attorney, Agent, or Firm—Gene W. Arant

[57] ABSTRACT

A switching apparatus contained inside box B consists of standard electrical units, and arranged in a way which is particularly advantageous for the purpose at hand. One of these units is a circuit breaker box containing two interruptible circuits, and having a mechanical reset switch. There are also a pair of magnetic contactors. Each magnetic contactor is used for switching a single conductor, and includes a pair of contact plates which are normally open so that current cannot pass through them, together with a coil which can be energized for causing the plates to close. In addition to the circuit breaker box and the magnetic contactors, there are heavy copper conductors, or buss bars, which make the necessary connections between the circuit units.

2 Claims, 5 Drawing Figures

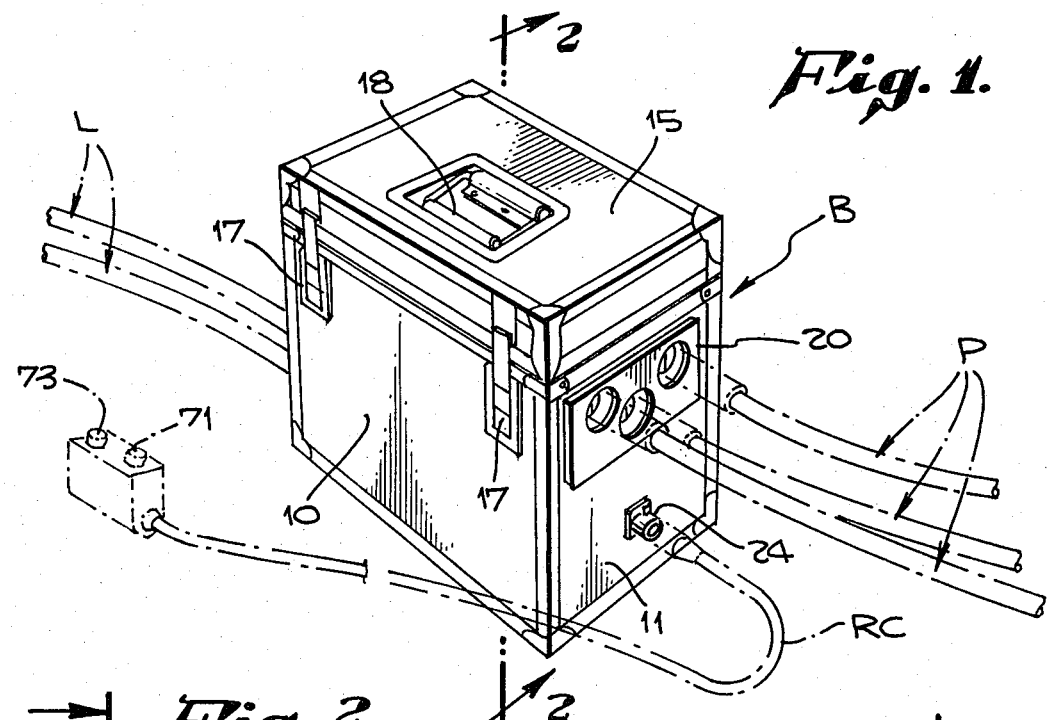
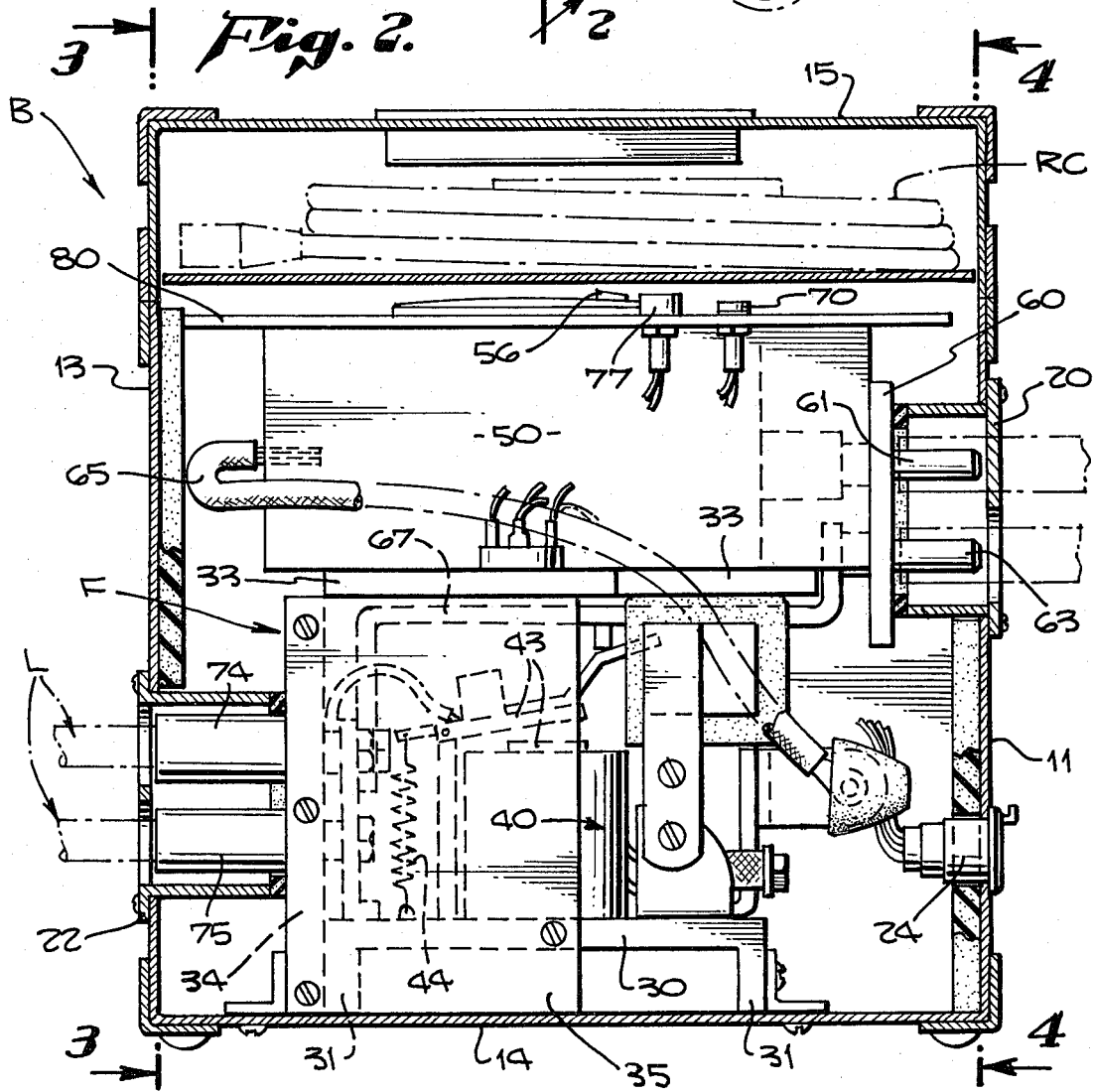

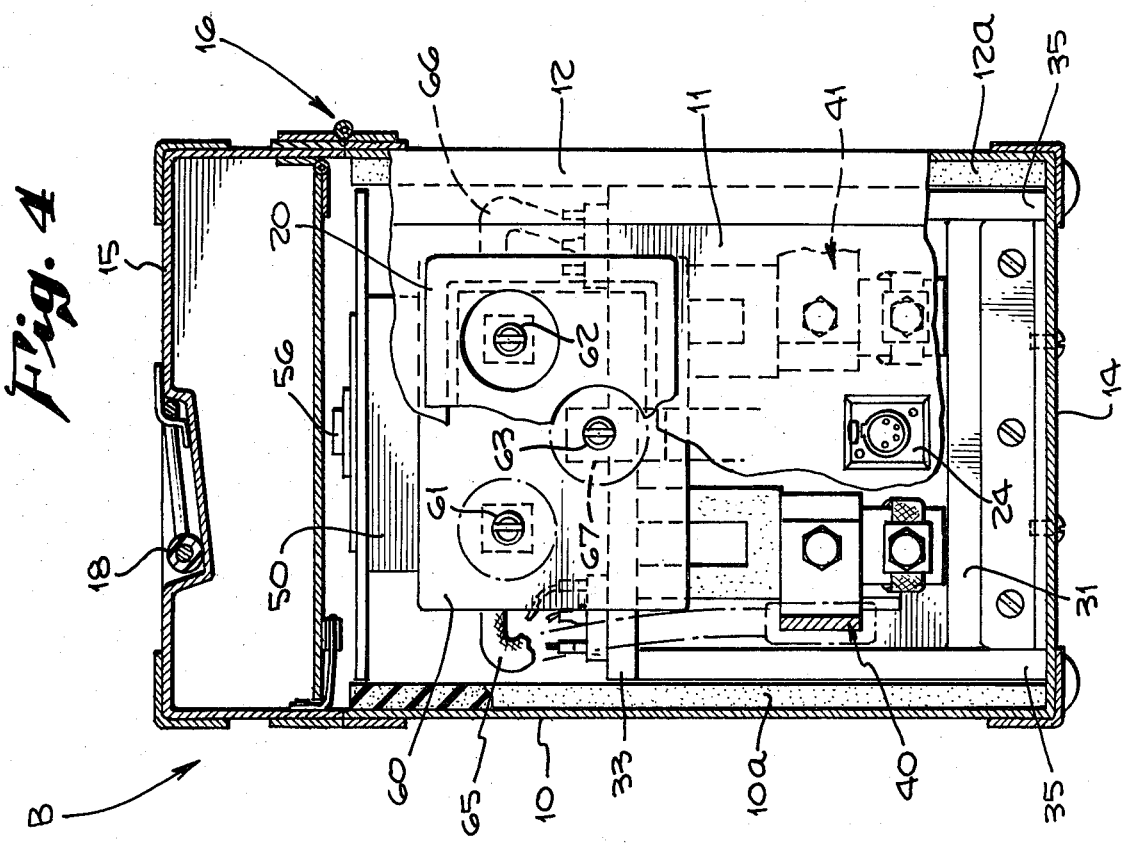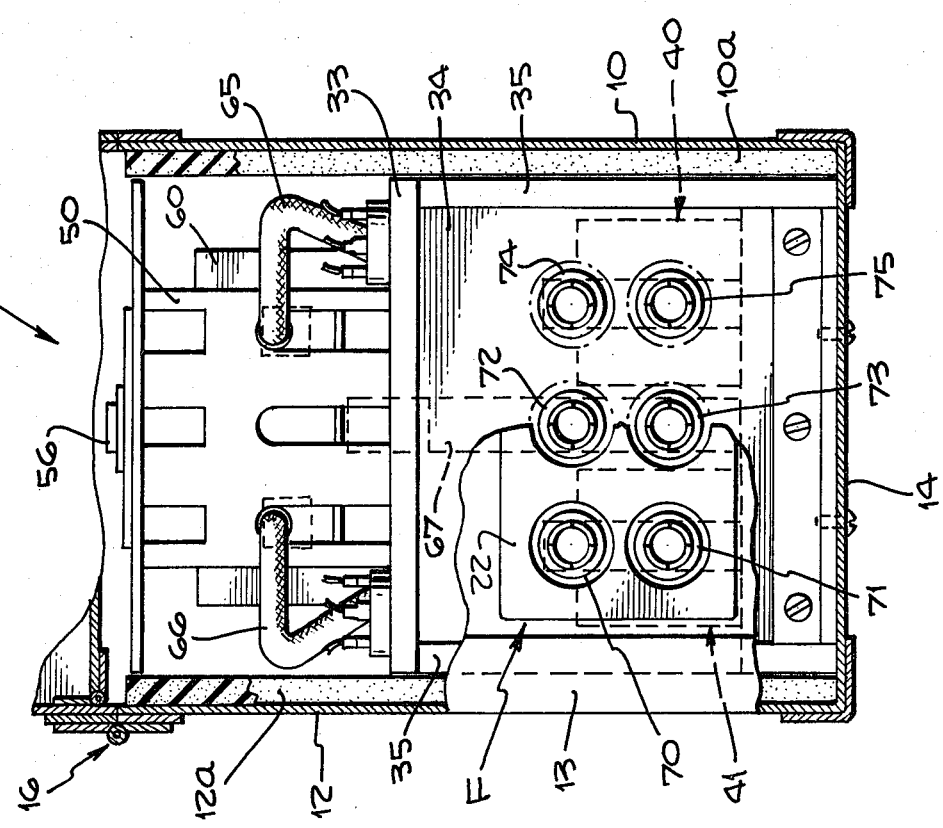

PORTABLE SWITCHING UNIT

BACKGROUND OF THE INVENTION

In making movies on location it is necessary to transport a great deal of special equipment. Much of this equipment is used for lighting purposes. When the shooting of a scene commences, a large number of lights must be turned on more or less instantaneously. When the shooting is interrupted for more than a very brief time the lights are turned off.

Continuous operation of the lights would involve an excessive expense. It would also subject the actors and actresses and work crews to unnecessary eyestrain. Furthermore, the continuous burning of the lights could produce excessive heat, which would be undesirable for many reasons.

In order to control lighting for this purpose it is necessary to have switching units that can be transported to the particular movie location. The switching equipment must have high electrical capacity, be easily controlled, and be safe to use by the operating crews.

PRIOR ART

A conventional switching unit which has been extensively used for movie work on location is the Mole-Richardson Type 3801. This switching unit is very heavy and very bulky, and cannot be carried by hand, but instead moves on wheels.

SUMMARY OF THE INVENTION

The present invention provides a switching unit suitable for use on movie locations which is comparatively small and of relatively light weight, and which can be carried by hand.

DRAWING SUMMARY

FIG. 1 is a perspective view of the presently preferred form of the portable switching unit according to the invention;

FIG. 2 is a cross sectional elevational view of the portable switching unit taken on line 2—2 of FIG. 1;

FIG. 3 is a transverse cross sectional view of the output end of the switching unit taken on line 3—3 of FIG. 2;

FIG. 4 is a transverse cross sectional view of the input end of the switching unit taken on line 4—4 of FIG. 2.

DETAILED DESCRIPTION

Figure 5:
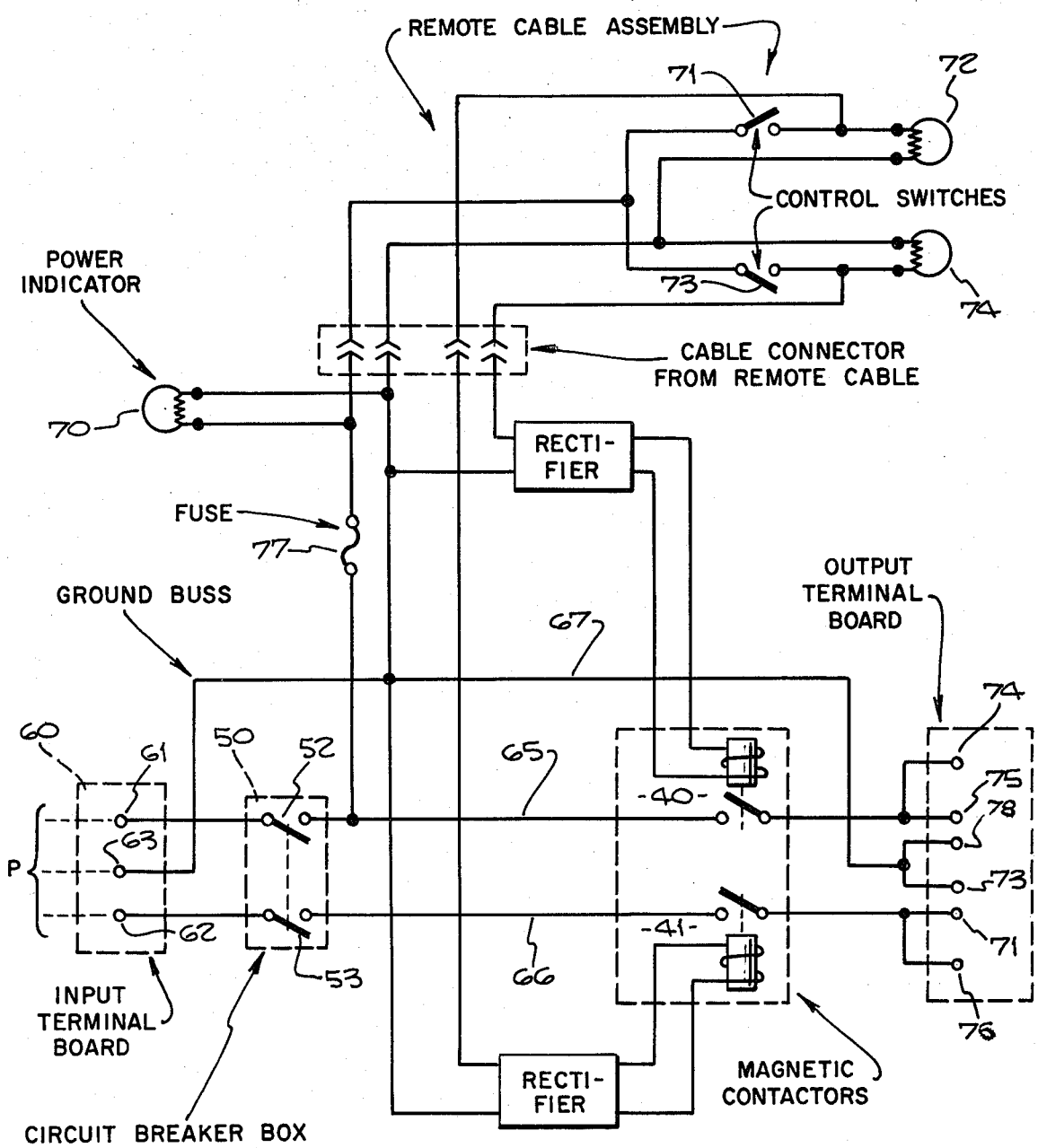
FIG. 5 is a schematic wiring diagram of the portable switching unit.

The portable switching unit of the present invention is contained in a carrying box B that is best seen in FIG. 1. Box B has side walls 10 and 12, and end walls 11 and 13. It has a bottom wall 14. It has a lid 15 which is hinged at 16 to the side wall 12 (see FIG. 4), and which can be secured to the other side wall 10 by means of latches 17 (FIG. 1). A carrying handle 18 is provided on top of the lid.

End wall 11 has an opening in which a removable panel 20 is secured. Power circuit P consisting of three conductors is brought through openings in panel 20 into the interior of box B.

In similar fashion the end wall 13 has another opening in which a removable panel 22 is secured. Panel 22 has openings through which the conductors of load circuits L are brought out from box B.

Panel 20 for receiving power circuit P is located in the upper part of end wall 11. In the lower part of end wall 11 there is still another opening in which a cable connector 24 is positioned. The purpose of cable connector 24 is for removable connection of remote cable RC, as shown in FIG. 1 in dotted lines.

The lid 15 of box B has a hollow interior portion, and when the portable switching unit is being transported the remote control cable RC is coiled up and placed within this space. This is shown in dotted lines at the top of FIG. 2.

The switching apparatus contained inside the box B consists of standard electrical units, and arranged in a way which is particularly advantageous for the purpose at hand. One of these units is a circuit breaker box containing two interruptible circuits, and having a mechanical reset switch. There are also a pair of magnetic contactors. Each magnetic contactor is used for switching a single conductor, and includes a pair of contact plates which are normally open so that current cannot pass through them, together with a coil which can be energized for causing the plates to close. In addition to the circuit breaker box and the magnetic contactors, there are heavy copper conductors, or buss bars, which make the necessary connections between the circuit units.

A frame F is positioned inside the carrying box B, for supporting the various circuit units in their proper positions. Thus the frame F includes a lower base plate 30, best seen in FIG. 2, which is supported by feet 31 on its two ends and spaced a short distance above the bottom wall 14 of box B. An upper base plate 33 is also horizontal, and is positioned slightly above the vertical center of the side walls and end walls. Upper base plate 33 is supported from lower base plate 30 by means of an end wall 34 that is near to the end wall 13 of box B, and also by a pair of partial side walls 35 that are contiguous to the end wall 34. Immediately inside the side walls 10 and 12 of box B are insulating boards 10a and 12a, best seen in FIG. 3. Partial side walls 35 of frame F sit rather closely against the insulating boards 10a, 12a, but not so tightly as to prevent removal of frame F from the box, when that is desired. A cover plate 80 rests on top of breaker box 50. Fuse 77 and indicator light 70 are mounted in the cover plate, which also has an opening through which breaker reset switch 56 is accessible.

A pair of magnetic contactors 40, 41 rest upon the lower base plate 30 of frame F. A side view of magnetic contactor 40, partly in dotted lines, is shown in FIG. 2. It includes a pair of normally open contact plates 43 which are held in open position by a spring 44. An electrical coil positioned beneath the lower contact plate will, when energized, cause the plates to close, thereby closing a circuit connected to the two ends of the device.

A circuit breaker box 50 rests upon the upper base plate 33 of frame F. It contains a pair of interruptible circuits, or switches, 52 and 53.

An input terminal board 60 is vertically positioned just inside the removable panel 20, as shown in FIG. 2. The input terminal board is secured to one end of the circuit breaker box 50. Metal terminals 61, 62 in the form of solid cylindrical brass bars extend outward from input terminal board 60 into the hollow interior of the removable panel 20. They also extend into the interior of the circuit breaker box where they are connected to respective ones of the interruptible circuits, or switches, 52 and 53. A similar metal terminal 63 is carried in the lower part of terminal board 60 but is not connected into the breaker box. See FIGS. 2 and 4.

A pair of heavy electrical conductors, or buss bars, 65 and 66 are connected to the output end of the breaker box 50, as shown at the left side of FIG. 2. These heavy conductors are curved around the corners of the breaker box, and extend above the upper base plate 33 towards the input terminal board 60. They then are bent downwardly where their lower ends are connected to one end of corresponding magnetic contactors 40, 41, respectively. The ground terminal 63 is connected to a third heavy duty conductor 67, which then passes underneath the upper base plate 33 towards the end wall 13 of the carrying box, and then downward, as shown by dotted lines in FIG. 2.

The end wall 34 of frame F acts as an output terminal board. A set of six output terminals 70 through 75, inclusive, are secured to it. See FIG. 3. These output terminals are of the female type, i.e., hollow metal cylinders, each covered by a cylinder of insulating material. Terminals 70 and 71 are electrically connected in parallel to each other and to the output terminal of the magnetic contactor 41. Both of the terminals 72 and 73 are connected to the output end of ground conductor 67. Both of the terminals 74 and 75 are connected to each other and to the output terminal of magnetic contactor 40.

Reference is now made to FIG. 5 showing the electrical circuit of the portable switching unit in schematic form. A three-conductor single phase power line P is connected to the input terminals 61, 62, 63 of input terminal board 60. Ground buss 67 connects the input ground terminal 63 directly to the output ground terminals 72, 73. The energized circuit connector 61 is coupled through interruptible circuit 52 of circuit breaker box 50 and cable 65 and magnetic contactor 40 to the output terminals 74, 75. In similar fashion the energized connector 62 is coupled through interruptible circuit 53 of the circuit breaker box 50 and cable 66 and magnetic contactor 41 to the output terminals 71, 72.

Since two sets of heavy duty output terminals are provided, the switching unit is capable of switching four load circuits simultaneously. For example, when magnetic contactor 40 is closed, two load circuits are provided between output terminal 74, 75 and the ground terminals. And when contactor 41 is closed, two additional load circuits are provided through output terminal 71, 72 and the ground terminals.

An indicator light 70 located in conjunction with carrying box B will indicate that power is available for the remote cable assembly RC. The closing of a control switch 71 will energize the actuating coil of magnetic contactor 41, and at the same time will cause indicator light 72 at the remote location to become illuminated. Similarly, the closing of control switch 73 will energize the actuating coil for magnetic contactor 40 while simultaneously illuminating indicator light 74 at the remote location.

An important feature of the invention is the ability to reset the circuit breaker when, for any reason, one of the interruptible circuits is opened. For this purpose a mechanical reset switch 56, shown in FIG. 2, is provided.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A remotely controlled portable heavy duty electrical switch including:
    a lower base plate, having two ends and corresponding feet for maintaining the base plate in an elevated position;
    a pair of magnetic contactors which rest on top of the lower base plate and are secured to it, each contactor having an input terminal and an output terminal, both input terminals being located at one end of said lower base plate and the output terminals being located at the other end of said lower base plate;
    an upper base plate disposed above the magnetic contactors and having associated sidewall means which extend downwardly towards and are secured to the lower base plate;
    a circuit breaker box disposed upon and secured to said upper base plate, said circuit breaker box containing two interruptible circuits and also having a mechanical reset switch on its exposed upper surface;
    an input terminal board carrying a set of three input terminals and secured to one end of said breaker box above said one end of said lower base plate, the first and third input terminals being connected to respective ones of said interruptible circuits;
    a pair of heavy duty electrical conductors each connected to a corresponding interruptible circuit at the other end of said circuit box, said conductors extending around corresponding lateral sides of said circuit box to locations beneath said input terminal board and being there connected to input terminals of corresponding magnetic contactors;
    a third heavy duty electrical conductor connected to the second one of said terminals on said input terminal board and extending underneath said circuit breaker box and between said magnetic contactors to the other end of said contactors;
    an output terminal board secured to the other end of said lower base plate and carrying at least one set of three output terminals, the first and third output terminals being connected to output ends of respective ones of said magnetic contactors, and the third output terminal being connected to said third heavy duty conductor; and
    each of said magnetic contactors having a normally open pair of contact plates, and coil means energizable for closing said plates so as to energize a corresponding pair of said output terminals.

2. A remotely controlled portable heavy duty electrical switch comprising, in combination:
    a rectangular open-topped carrying box having side and end walls and a bottom wall, having a lid hingedly fastened to one side wall of said box, having latch means on the other side wall of said box manually operable for securing the lid when in the closed position, and having carrying handle means for carrying the box and contents;
    a pair of magnetic contactors positioned within the lower part of said box;
    a circuit breaker having a pair of interruptible circuits disposed within the upper part of said box, said circuit breaker having a mechanical reset switch which is exposed when the box is open;

an input terminal board positioned in an opening in one wall of said box and accessible for externally connecting a power circuit thereto, said input terminal board being internally connected to said interruptible circuits of said circuit breaker;

an output terminal board carried in another opening in a wall in said box and being externally accessible for connecting load circuits thereto, said output terminal board being internally connected to said magnetic contactors;

conductor means connecting said magnetic contactors in series with corresponding interruptible circuits of said circuit breaker;

a remote control cable normally coiled within the upper portion of said carrying box, and having control switch means on its remote end; and the inner end of said remote control cable containing conductors connectable to said magnetic contactors for controlling the operation thereof, and also containing additional conductors connectable to said input terminal board for receiving the energy by which to control and actuate said magnetic contactors.

* * * * *